US012167165B2

(12) United States Patent
Mandal et al.

(10) Patent No.: US 12,167,165 B2
(45) Date of Patent: *Dec. 10, 2024

(54) EFFICIENT ELECTRO-OPTICAL TRANSFER FUNCTION (EOTF) CURVE FOR STANDARD DYNAMIC RANGE (SDR) CONTENT

(71) Applicant: Microsoft Technology Licensing, LLC, Redmond, WA (US)

(72) Inventors: Saswata Mandal, Bellevue, WA (US); Ryan Yonghee Kim, Bellevue, WA (US); Kathleen Anne Slattery, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,974

(22) Filed: Sep. 13, 2023

(65) Prior Publication Data

US 2024/0031525 A1 Jan. 25, 2024

Related U.S. Application Data

(63) Continuation of application No. 17/862,000, filed on Jul. 11, 2022, now Pat. No. 11,792,359, which is a continuation of application No. 17/028,439, filed on Sep. 22, 2020, now Pat. No. 11,412,174.

(51) Int. Cl.
*H04N 7/01* (2006.01)
*H04N 9/64* (2023.01)
*H04N 19/85* (2014.01)

(52) U.S. Cl.
CPC ............... *H04N 7/01* (2013.01); *H04N 9/646* (2013.01); *H04N 19/85* (2014.11)

(58) Field of Classification Search
CPC .......... H04N 7/01; H04N 9/646; H04N 19/85; H04N 7/015; H04N 5/202; H04N 9/64; H04N 9/69
USPC .................................................. 348/441, 453
See application file for complete search history.

(56) References Cited

U.S. PATENT DOCUMENTS

| | | | | |
|---|---|---|---|---|
| 9,967,533 | B2* | 5/2018 | Toma | H04N 9/68 |
| 10,027,856 | B2* | 7/2018 | Tsukagoshi | H04N 5/202 |
| 10,291,881 | B2* | 5/2019 | Toma | H04N 9/642 |
| 2016/0205338 | A1* | 7/2016 | Kozuka | H04N 5/57 |
| | | | | 348/687 |
| 2018/0014040 | A1* | 1/2018 | Tsukagoshi | H04N 19/70 |
| 2018/0020128 | A1* | 1/2018 | Tsukagoshi | H04N 5/202 |
| 2018/0061026 | A1* | 3/2018 | Kozuka | H04N 9/69 |
| 2019/0045156 | A1* | 2/2019 | Oh | H04N 9/67 |
| 2019/0116349 | A1* | 4/2019 | Thompson | H04N 9/67 |
| 2019/0139201 | A1* | 5/2019 | Eto | H04N 7/01 |
| 2019/0335081 | A1* | 10/2019 | Baar | H04N 7/01 |

* cited by examiner

*Primary Examiner* — Sherrie Hsia
(74) *Attorney, Agent, or Firm* — Klarquist Sparkman, LLP

(57) ABSTRACT

The present disclosure relates to systems and methods for transmitting Standard Dynamic Range (SDR) content. The systems and methods may use a modified Electro-Optical Transfer Function (EOTF) curve to convert nonlinear color values of SDR content into optical output values of modified SDR content. The systems and methods may encode the modified SDR content using eight bits while preventing banding. The systems and methods may transmit the encoded data to a client device for presentation on a display.

20 Claims, 6 Drawing Sheets

EFFICIENT ELECTRO-OPTICAL TRANSFER FUNCTION (EOTF) CURVE FOR STANDARD DYNAMIC RANGE (SDR) CONTENT

CROSS REFERENCE TO RELATED APPLICATIONS

This application is a Continuation of U.S. patent application Ser. No. 17/862,000, filed Jul. 11, 2022, which is a Continuation of U.S. patent application Ser. No. 17/028,439, filed Sep. 22, 2020, which is incorporated herein by reference in its entirety.

BACKGROUND

The way human eyes perceive an image or luminance of an image is different from how a television and/or a display device presents an image. Human eyes may notice more difference in lower range of values than higher range. Encoders that encode an image or video may be unaware of the differences between human perception of images and how a television and/or a display device may present an image. Prior to encoding an image or video, the image or video is converted into a number system that the encoders use to encode the image or video. Encoders may treat all values equal, and thus, encoders may encode low brightness regions or high brightness regions in a similar manner. As such, encoders may waste precious bits in high ranges (e.g., bright regions of an image) where individuals cannot see the differences in an image or video.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a system. The system may include one or more processors; memory in electronic communication with the one or more processors; and instructions stored in the memory, the instructions being executable by the one or more processors to: receive standard dynamic range (SDR) content; convert the SDR content into modified SDR content using a modified Electro-Optical Transfer Function (EOTF) curve to convert nonlinear color values of the SDR content into optical output values in the modified SDR content; send the modified SDR content to an encoder to generate encoded data by encoding the modified SDR content using eight bits; and transmit the encoded data.

Another example implementation relates to a method. The method may include receiving standard dynamic range (SDR) content. The method may include converting the SDR content into modified SDR content using a modified Electro-Optical Transfer Function (EOTF) curve to convert nonlinear color values of the SDR content into optical output values in the modified SDR content. The method may include sending the modified SDR content to an encoder to generate encoded data by encoding the modified SDR content using eight bits. The method may include transmitting the encoded data.

Another example implementation relates to a computer-readable medium storing instructions executable by a computer device. The computer-readable medium may include at least one instruction for causing the computer device to receive standard dynamic range (SDR) content. The computer-readable medium may include at least one instruction for causing the computer device to convert the SDR content into modified SDR content using a modified Electro-Optical Transfer Function (EOTF) curve to convert nonlinear color values of the SDR content into optical output values in the modified SDR content. The computer-readable medium may include at least one instruction for causing the computer device to send the modified SDR content to an encoder to generate encoded data by encoding the modified SDR content using eight bits. The computer-readable medium may include at least one instruction for causing the computer device to transmit the encoded data.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
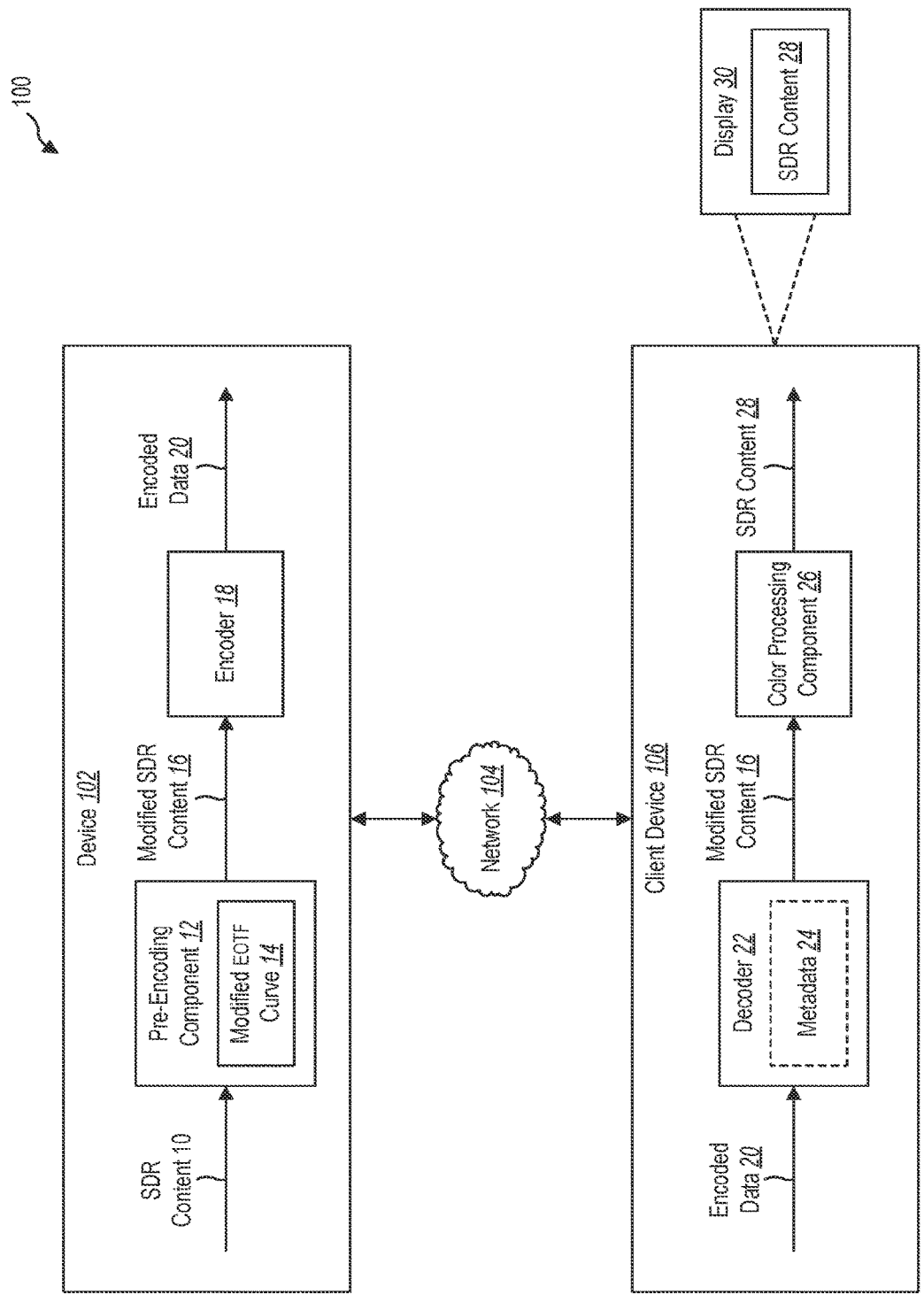
FIG. 1 illustrates an example system for transmitting SDR content in accordance with an implementation of the present disclosure.

This disclosure generally relates to Standard Dynamic Range (SDR) content. The way human eyes perceive an image or luminance of an image is different from how a television and/or a display device presents an image. Human eyes may notice more difference in lower range of values than higher range. For example, individuals are more sensitive to darker parts of an image and may notice differences in the darker parts of an image verses a same amount of difference in a bright part of an image.

Encoders that encode an image or video may be unaware of the differences between human perception of images and how a television and/or a display device may present an image. Prior to encoding an image or video, the image or video is converted into a number system that the encoders use to encode the image or video. Encoders may treat all values equal, and thus, encoders may encode low brightness regions or high brightness regions in a similar manner. As such, encoders may waste precious bits in high ranges (e.g., bright regions of an image) where individuals cannot see the differences in an image or video.

Different Electro-Optical Transfer Function (EOTF) curves defined by the Society of Motion Picture and Television Engineers (SMPTE) standards may be used to convert the image or video prior to encoding. Currently, for all Standard Dynamic Range (SDR) content, an EOTF curve SMPTE Rec. 709 is used, as defined in the SMPTE standards, which is not consistent with human perception of an image. SDR content covers up to 100 nits, where one nit is a unit of brightness equal to one candelas per square meter cd/m2. The SMPTE Rec. 709 EOTF curve uses 8 bits of color depth, which limits the granularity of the darker content in SDR images or videos.

For High Dynamic Range (HDR) content a new type of EOTF curve is used, SMPTE Rec. 2084, as defined in the SMPTE standards, which is consistent with human perception of an image. HDR content covers up to 10,000 nits and uses 10 bits encoding. As such, the EOTF SMPTE Rec. 2084 curve may enable the creation of video images with an increased luminance range so that the upper ranges of scene exposure may not need to be highly compressed while still providing realism and scene presence in the video images. While the EOTF SMPTE Rec. 2084 curve is more consistent with human perception, the EOTF SMPTE Rec. 2084 curve is specifically designed for HDR content and is not applicable to SDR content.

The devices and methods may use a modified SMPTE Rec. 2084 EOTF curve in such a way that the modified EOTF curve only covers the 100 nits needed for SDR content while encoding at 8 bit precision without showing banding. This disclosure includes several practical applications that provide benefits and/or solve problems associated with improving transmitting SDR content to a client device for presentation on a display.

The devices and methods may improve a quality of the images transmitted in SDR content. The devices and methods may also save encoded bits during the encoding of SDR content, and thus, reducing networking bandwidth requirements for streaming SDR content. The modified EOTF curve may make encoding more efficient by achieving the same or better image quality while using less bits during encoding, for example, 7% less bits.

As such, the devices and methods may reduce a bit rate for encoding the SDR content while maintaining or improving a quality of the images displayed by preventing banding while encoding at a lower bit rate. Thus, the devices and methods may provide SDR content that may be consistent with human perception of the image.

Referring now to FIG. 1, illustrated is a system 100 for use with transmitting SDR content 10 from one or more devices 102 to one or more client devices 106 via a network 104 for presentation on a display 30. Device 102 may receive SDR content 10 from a plurality of content providers, such as, game developers, application developers, television content publishers, and/or any third-party content publisher. Device 102 may host or otherwise provide SDR content 10 to one or more client devices 106.

SDR content 10 may include, but is not limited to, images and/or videos. In an implementation, SDR content 10 may include images or videos for gaming content for a digital game. In another implementation, SDR content 10 may include images or videos for movies and/or shows. In another implementation, SDR content 10 may include still images.

Devices(s) 102 and client device(s) 106 may communicate with each other directly or indirectly through a network 104. The network 104 may include one or multiple networks and may use one or more communication platforms or technologies suitable for transmitting data. The network 104 may refer to any data link that enables transport of electronic data between devices and/or modules of the system 100. The network 104 may refer to a hardwired network, a wireless network, or a combination of a hardwired and a wireless network. In one or more implementations, the network 104 includes cellular networks.

Device 102 and/or client device 106 may include any mobile or fixed computer device, which may be connectable to network 104. Device 102 and/or client device 106 may include, for example, a mobile device, such as, a mobile telephone, a smart phone, a personal digital assistant (PDA), a tablet, or a laptop. Additionally, or alternatively, device 102 and/or client device 106 may include one or more non-mobile devices such as a desktop computer, server device, or other non-portable devices. Additionally, or alternatively, device 102 and/or client device 106 may include a gaming device, a mixed reality or virtual reality device, a music device, a television, a navigation system, or a camera, or any other device having wired and/or wireless connection capability with one or more other devices. In one or more implementations, devices 102 and/or client devices 106 refer to dedicated gaming devices (e.g., handheld gaming devices) or a video game console in communication with a display 30. Device 102 and/or client device 106 may include features and functionality described below in connection with FIG. 3.

The components of pre-encoding component 12, encoder 18, decoder 22, and/or color processing component 26 may include hardware, software, or both. For example, the components of pre-encoding component 12, encoder 18, decoder 22, and/or color processing component 26 may include one or more instructions stored on a computer-readable storage medium and executable by processors of one or more computing devices. When executed by the one or more processors, the computer-executable instructions of one or more computing devices (e.g., pre-encoding component 12, encoder 18, decoder 22, and/or color processing component 26) can perform one or more methods described herein. Alternatively, the components of pre-encoding component 12, encoder 18, decoder 22, and/or color processing component 26 may include hardware, such as a special purpose processing device to perform a certain function or group of functions. Additionally, or alternatively, the components of pre-encoding component 12, encoder 18, decoder 22, and/or color processing component 26 may include a combination of computer-executable instructions and hardware.

Client device 106 may send a request to receive, or otherwise access, SDR content 10 from device 102 for presentation on display 30. In an implementation, SDR content 10 may be streamed to client device 106 from device 102. In one or more implementations, one or more of the client devices 106 may include a display 30 with a graphical user interface thereon (e.g., a screen of a mobile device). In addition, or as an alternative, one or more of the client devices 106 may be communicatively coupled (e.g., wired or wirelessly) to a display 30 having a graphical user interface thereon for providing a display of content.

One example use case may include client device 106 requesting to stream a movie or show for presentation on display 30. Another example use case may include client device 106 requesting to stream gaming content for a digital game for presentation on display 30.

Device 102 may include a pre-encoding component 12 that may receive the SDR content 10 requested by client device 106 and may identify that SDR content 10 is in an SDR format. For example, SDR content 10 may be encoded using Rec. 709. In an implementation, device 102 may be a gaming console and pre-encoding component 12 may be hardware in the display pipeline of the gaming console. In another implementation, device 102 may be a personal computer and pre-encoding component 12 may be hardware in the graphics processing unit (GPU) pipeline.

Pre-encoding component 12 may select a modified EOTF curve 14 for converting the SDR content 10 from nonlinear color values provided with the SDR content 10 to an optical output value. Thus, instead of using the SMPTE Rec. 709 EOTF curve for pre-processing the SDR content 10 prior to encoding, pre-encoding component 12 may select the modified EOTF curve 14 for pre-processing the SDR content 10 prior to encoding.

The modified EOTF curve 14 may provide an efficient mapping from digital code values containing as few as 8 bits to a luminance range of 100 candelas per square meter (cd/m2), where one nit is equal to one cd/m2. As such, the modified EOTF curve 14 may be constrained to the 100 nits needed for SDR content. The modified EOTF curve 14 may also allow encoding at 8 bit precision without showing banding. Banding may include a line between different color regions of an image. The modified EOTF curve 14 may allow encoding at 8 bit precision while maintaining a smooth gradation from one color to a different color in the image. By combining the use of Rec. 709 color space (which is a smaller color space relative to the International Telecommunication Union (ITU) Recommendation 2020 color space, also known as, Rec. 2020) and the additional gradation provided with the modified EOTF curve 14, banding may be prevented in SDR images. Using the modified EOTF curve 14 may provide SDR images with an increase in realism and sense of presence, and thus, may provide images more consistent with human perception. The modified EOTF curve 14 may represent a number system that closely matches how humans respond to light intensity. Thus, the modified EOTF curve 14 may be a quantizing function that mimics human perception for use with SDR video and images.

Pre-encoding component 12 may use the modified EOTF curve 14 to convert SDR content 10 to modified SDR content 16. Pre-encoding component 12 may use the modified EOTF curve 14 to transform the pixel input values for the captured SDR content 10 to the pixel output values for the modified SDR content 16. For example, the SDR content 10 may be represented in 8 bits and the pixel input values may be a value in a range of 0 to 255. Pre-encoding component 12 may send, or otherwise transmit, the modified SDR content 16 to encoder 18. Encoder 18 may encode the modified SDR content 16 using 8 bits and may save the encoded data 20. For example, the encoded data 20 may be saved in a MP4 format or any other container format to allow streaming over the internet.

Device 102 may transmit the encoded data 20 to client device 106. For example, device 102 may stream the encoded data 20 to client device 106 via network 104. Since encoding was performed using 8 bits, an amount of network bandwidth required to transmit the encoded data 20 may be reduced. By using the modified EOTF curve 14, the same or better image quality may be achieved using less bits during encoding. For example, 7% less bits may be used during the encoding process when using the modified EOTF curve 14.

A decoder 22 may receive the encoded data 20 and may decode the encoded data 20. Decoder 22 may identify that the encoded data 20 used the modified EOTF curve 14 and may decode the encoded data 20 into decoded modified SDR content 16. In an implementation, metadata 24 may be transmitted with the encoded data 20 as side band data that provides information that the modified EOTF curve 14 was used. For example, the information may include custom information for the modified EOTF curve 14. Decoder 22 may use metadata 24 to identify that the modified EOTF curve 14 was used and may provide decoded modified SDR content 16 in response to identifying that the modified EOTF curve 14 was used.

In another implementation, extra information may be specified into the encoded data 20 indicating that the modified EOTF curve 14 was used. For example, the encoded data 20 may be an Advanced Video Coding (AVC) stream (also known as H.264) or a High Efficiency Video Coding (HEVC) stream (also known as H.265) and extra information may be specified into the H.264 or HEVC stream. By adding the extra information into the encoded data 20, the encoded data 20 may not comply with the specifications for the encoded data 20. Decoder 22 may be designed to recognize the noncompliant encoded data 20. For example, by adding extra information into the H.264 or HEVC stream about the modified EOTF curve 14, the H.264 or HEVC stream may be noncompliant with the specifications for H.264 and HEVC. Decoder 22 may recognize the noncompliant H.264 or HEVC streams and may use the noncompliant H.264 or HEVC streams to identify that the modified EOTF curve 14 was used. Decoder 22 may provide decoded modified SDR content 16 for the noncompliant H.264 or HEVC streams in response to identifying that the modified EOTF curve 14 was used.

Decoder 22 may provide the decoded modified SDR content 16 to a color processing component 26. The color processing component 26 may convert the modified SDR content 16 to SDR content 28 in a standard format. Color processing component 26 may apply a transfer function to the decoded modified SDR content 16. The transfer function may receive the pixel values of the decoded modified SDR content 16 as input and may convert the received pixel values for the modified SDR content 16 into pixel values in a standard format. Display 30 may operate in a specified viewing environment. For example, display 30 may be designed to present video SDR content in a Rec. 709 format. As such, color processing component 26 may convert the pixel values of the modified SDR content 16 into pixel values in a Rec. 709 format and my output SDR content 28 in a Rec. 709 format.

In an implementation, the modified EOTF curve 14 may provide a relationship between the nonlinear color values provided to a display device and the linear color values produced by the display device. As such, color processing component 26 may use the modified EOTF curve 14 directly and may convert the decoded modified SDR content 16 into linear light information for easier presentation on display 30.

Display 30 may present SDR content 28. SDR content 28 presented on display 30 may be more consistent with human perception of images. SDR content 28 may have more visual information present in the images and/or videos since the modified EOTF curve 14 was used as compared to using the SMPTE Rec. 709 EOTF curve. For example, SDR content 28 may provide realism in the darker portions of the images. Moreover, SDR content 28 may not have banding occurring in the images or videos.

An example use case may include a user streaming gaming data for a digital game using a 3G cellular network for display on client device 106. The images or videos for the gaming data may include SDR content 10. By using the modified EOTF curve 14 for the SDR content 10 in the gaming data, the user may still receive good image quality on display 30 even though the bandwidth for the 3G cellular network may be limited.

Another example use case may include using the modified EOTF curve 14 on a still image. The amount of visual information lost (e.g., details in the image) during the compression and transmission of the still image to a client device 106 using the modified EOTF curve 14 may be reduced as compared to the amount of information lost for the image when using the SMPTE Rec. 709 EOTF curve. As such, the still image using the modified EOTF curve 14 may correspond with what the human eye normally sees.

While the above examples use the SMPTE Rec. 709 EOTF curve, which is the most common gamma curve used with SDR video, other standards may be used with pictures, such as, but not limited to, ProPhoto RGB, Adobe RGB, and/or sRGB. System 100 and the modified EOTF curve 14 may also be used with the other standards for SDR content.

As such, system 100 may be used to achieve better compression in terms of image quality by providing improved image quality with a lower bit rate. Thus, system 100 may be used to lower an amount of bandwidth required to transmit videos or images, while optimizing an image quality.

Figure 2A:
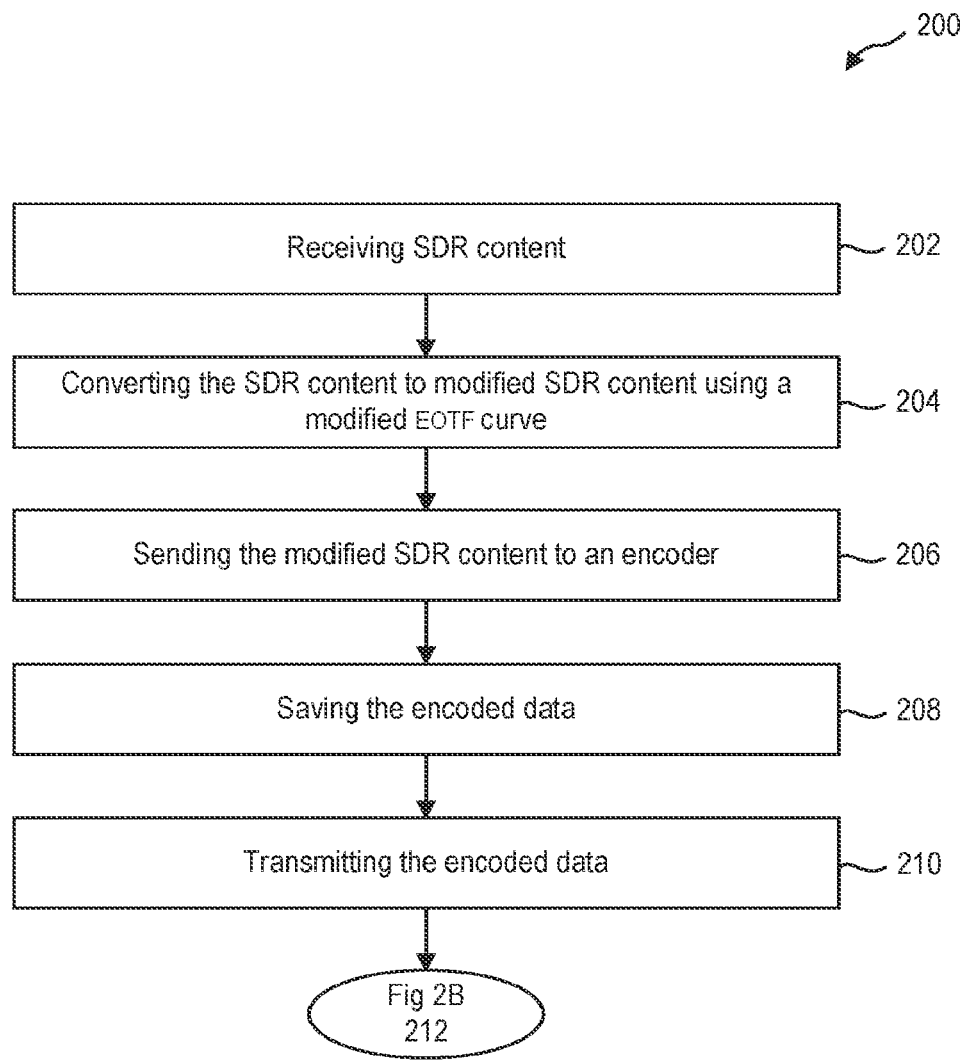
FIGS. 2A and 2B illustrate an example method for transmitting SDR content from a device to a client device for presentation on a display in accordance with an implementation of the present disclosure.
Figure 2B:
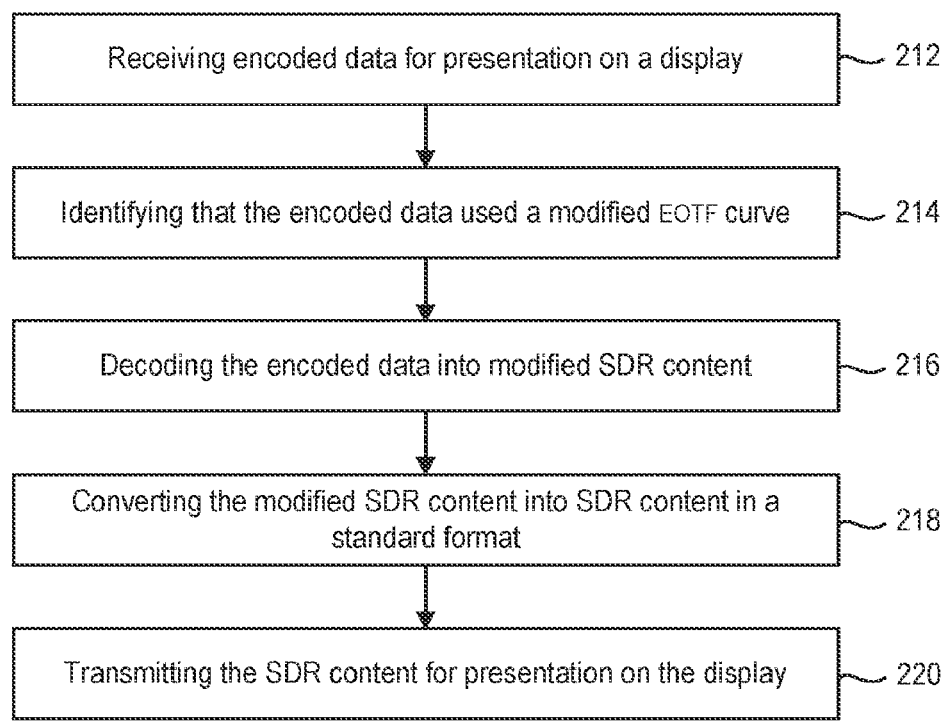

Referring now to FIGS. 2A and 2B, an example method 200 may be used by device 102 (FIG. 1) and client device 106 (FIG. 1) for transmitting SDR content 10 (FIG. 1). The actions of method 200 may be discussed below with reference to the architecture of FIG. 1.

At 202, method 200 may include receiving SDR content 202. A pre-encoding component 12 of device 102 may receive the SDR content 10 requested by client device 106. SDR content 10 may include videos or images. For example, SDR content 10 may include, but is not limited to, images or videos for gaming content for a digital game, videos for movies, videos for shows, and/or still images.

At 204, method 200 may include converting the SDR content to modified SDR content using a modified EOTF curve. Pre-encoding component 12 may use a modified EOTF curve 14 to convert SDR content 10 to modified SDR content 16. Pre-encoding component 12 may use the modified EOTF curve 14 to transform the pixel input values for the captured Rec. 709 SDR content 10 to the pixel output values for the modified SDR content 16. The pixel input values to the modified EOTF curve 14 may range from 0 to 255 for 8 bit content. Thus, instead of using the SMPTE Rec. 709 EOTF curve for pre-processing the SDR content 10 prior to encoding, pre-encoding component 12 may select the modified EOTF curve 14 for pre-processing the SDR content 10 prior to encoding.

The modified EOTF curve 14 may provide an efficient mapping from digital code values containing as few as 8 bits to a luminance range of 100 candelas per square meter (cd/m2), where one nit is equal to one cd/m2. As such, the modified EOTF curve 14 may be constrained to the 100 nits needed for SDR content. The modified EOTF curve 14 may allow encoding at 8 bit precision without showing banding.

Banding may include a line between different color regions of an image. The modified EOTF curve 14 may allow encoding at 8 bit precision while maintaining a smooth gradation from one color to a different color in the image. Using the modified EOTF curve 14 may provide SDR images with an increase in realism and sense of presence, and thus, may provide images more consistent with human perception. For example, the modified EOTF curve 14 may increase a level of granularity in darker portions of SDR content Users may not perceive banding in SDR content 10 because the granularity of the proposed EOTF curve 14 is almost two times the granularity of an EOTF SMPTE Rec. 2084 curve and HDR content uses Rec. 2020 color space, which covers three times more space than SDR color space Rec. 709. In addition, the modified EOTF curve 14 may reduce an amount of visual information lost in SDR content 10 during the compression of SDR content 10. As such, the modified EOTF curve 14 may represent a number system that closely matches how humans respond to light intensity.

At 206, method 200 may include sending the modified SDR content to an encoder. Pre-encoding component 12 may send, or otherwise transmit, the modified SDR content 16 to encoder 18.

At 208, method 200 may include saving the encoded data. Encoder 18 may generate encoded data by encoding the modified SDR content 16 using 8 bits and may save the encoded data 20. For example, the encoded data 20 may be saved in a MP4 format or any other container format to allow streaming over the internet.

At 210, method 200 may include transmitting the encoded data. Device 102 may transmit the encoded data 20 to client device 106. For example, device 102 may stream the encoded data 20 to client device 106 via network 104 in response to receiving a request from client device 106 to access SDR content 10. Since encoding was performed using 8 bits, an amount of network bandwidth required to transmit the encoded data 20 may be reduced compared to the amount of network bandwidth required to transmit data encoded using 10 bits.

At 212, method 200 may include receiving encoded data for presentation on a display. A decoder 22 on client device 106 may receive the encoded data 20 and may decode the encoded data 20.

At 214, method 200 may include identifying that the encoded data used a modified EOTF curve. Decoder 22 may identify that the encoded data 20 used the modified EOTF curve 14 and may decode the encoded data 20 into decoded modified SDR content 16. In an implementation, metadata 24 may be transmitted as side band data with the encoded data 20. Metadata 24 may provide custom information about the modified EOTF curve 14. Decoder 22 may use metadata 24 to identify that the modified EOTF curve 14 was used and may provide decoded modified SDR content 16 in response to identifying that the modified EOTF curve 14 was used. In another implementation, the encoded data 20 may include extra information added into the encoded data 20 indicating that the modified EOTF curve 14 was used. By adding the extra information into the encoded data 20, the encoded data 20 may not comply with the specifications for the encoded data 20. Decoder 22 may use the noncompliant encoded data 20 to identify that the modified EOTF curve 14 was used and may provide decoded modified SDR content 16 for the noncompliant encoded data 20 in response to identifying that the modified EOTF curve 14 was used.

At 216, method 200 may include decoding the encoded data into modified SDR content. Decoder 22 may decode the encoded data 20 into the modified SDR content 16.

At 218, method 200 may include converting the modified SDR content into SDR content in a standard format. Decoder 22 may provide the decoded modified SDR content 16 to a color processing component 26. The color processing component 26 may convert the modified SDR content 16 to SDR content 28 in a standard format. Color processing component 26 may apply a transfer function to the decoded modified SDR content 16. The transfer function may receive the pixel values of the decoded modified SDR content 16 as input and may convert the received pixel values for the modified SDR content 16 into pixel values in a standard format. The pixel input values to the transfer function may range from 0 to 255 and the pixel output values of the transfer function may range from 0 to 255 for 8 bit content. Display 30 may operate in a specified viewing environment. For example, display 30 may be designed to present SDR content 28 in a Rec. 709 format and color processing component 26 may convert the modified SDR content 16 to SDR content 28 in a Rec. 709 format.

At 220, method 200 may include transmitting the SDR content for presentation on the display. Color processing component 26 may transmit SDR content 28 for presentation on display 30 and display 30 may present SDR content 28. SDR content 28 presented on display 30 may be more consistent with human perception of images. SDR content 28 may have more visual information present in the images and/or videos since the modified EOTF curve 14 was used as compared to using the SMPTE Rec. 709 EOTF curve. For example, SDR content 28 may provide realism in the darker portions of the images. Moreover, SDR content 28 may not have banding occurring in the images or videos.

Method 200 may reduce a bit rate for encoding the SDR content 10 while maintaining or improving a quality of the images displayed by preventing banding. As such, method 200 may be used to display SDR content 28 that may be consistent with human perception of an image or video.

Figure 3:
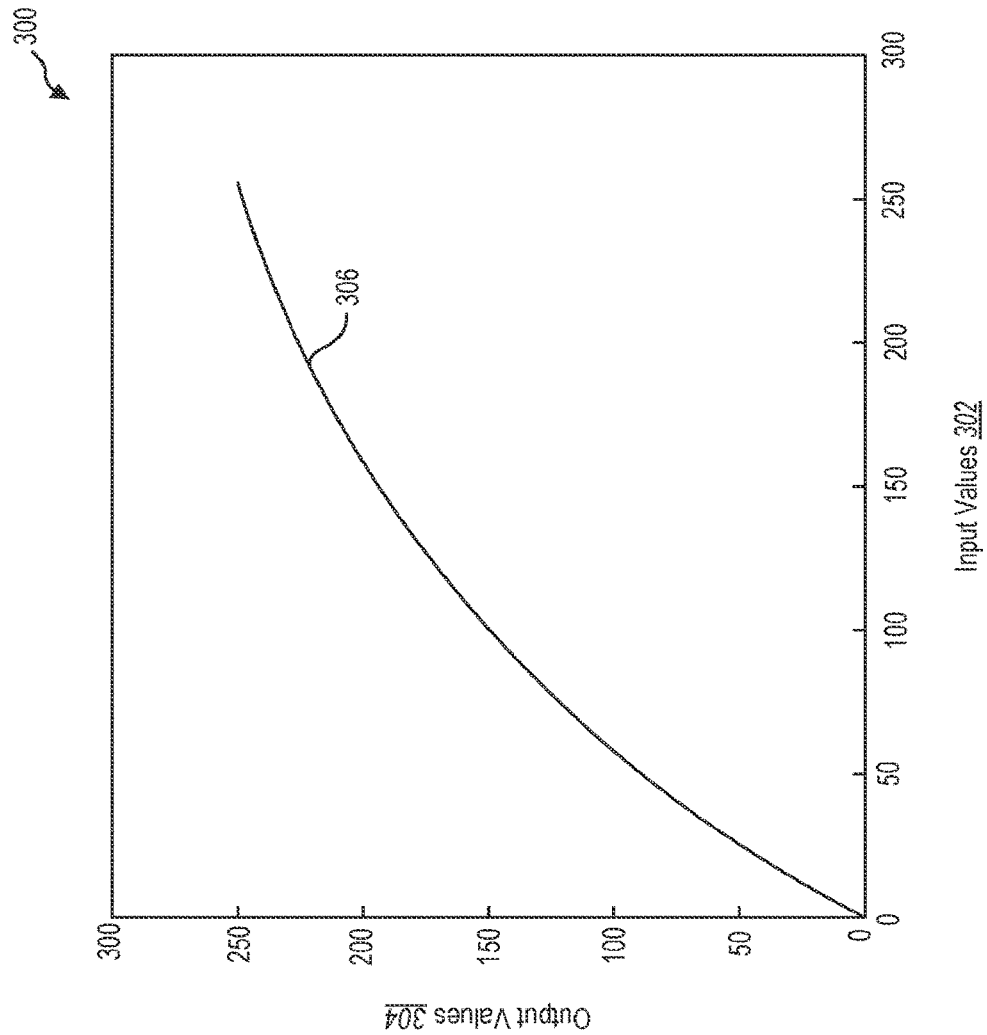
FIG. 3 illustrates an example graph of a transformation of pixel values using a modified EOTF curve in accordance with an implementation of the present disclosure.

Referring now to FIG. 3, graph 300 illustrates an example transformation of pixel values by the modified EOTF curve 14 (FIG. 1) prior to encoding. In this example, the captured SDR content 10 (FIG. 1) is encoded using Rec. 709. The X-axis represents pixel input values 302 for the SDR content 10 for Red, Green, or Blue channels of the SDR content 10. The SDR content 10 may be represented in 8 bits and the pixel input values 302 may range from 0 to 255. The Y-axis represents pixel output values 304 computed by the modified EOTF curve 14 for the modified SDR content 16 (FIG. 1) after the transformation. The pixel output values 304 may range from 0 to 255. The curve 306 illustrates the pixel output values 304 for the modified SDR content 16 versus the pixel input values 302 for the captured SDR content 10. For example, pre-encoding component 12 (FIG. 1) may use the modified EOTF curve 14 to transform the pixel input values 302 for the captured SDR content 10 to the pixel output values 304 for the modified SDR content 16.

Figure 4:
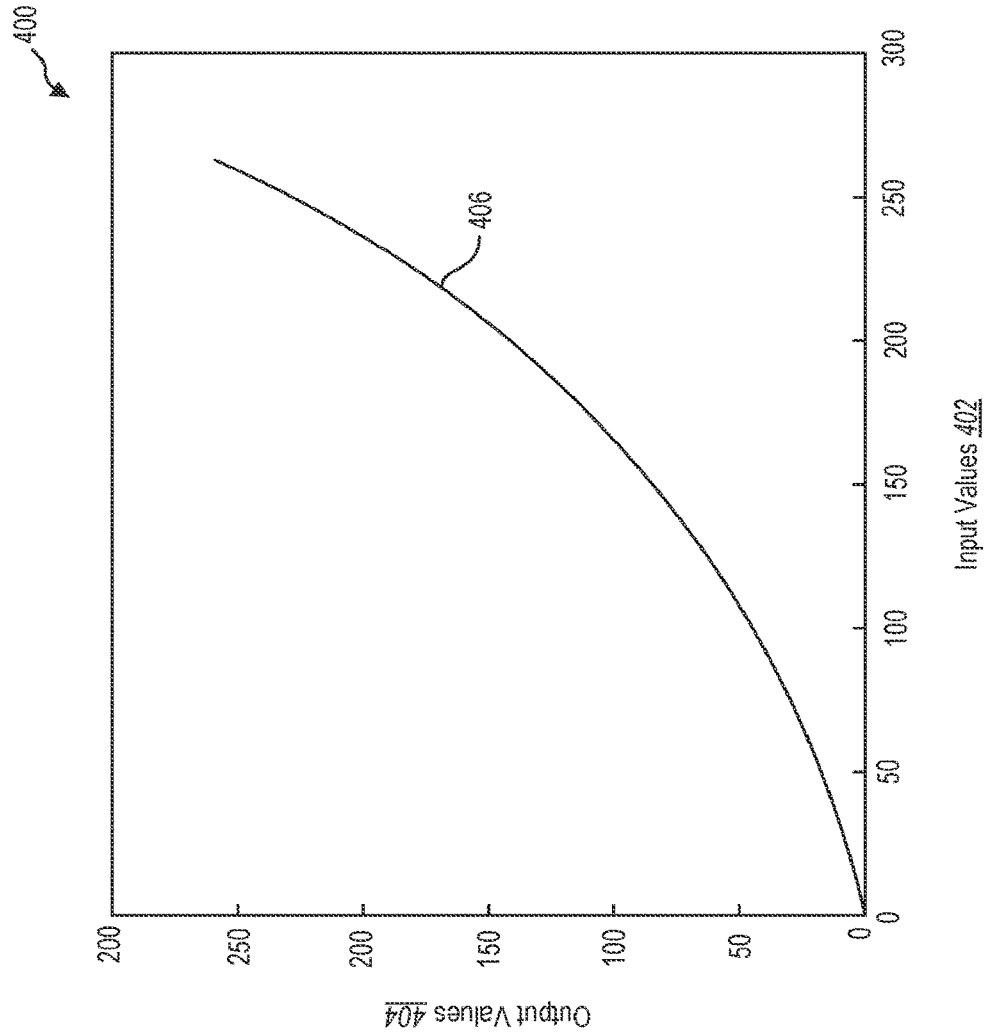
FIG. 4 illustrates an example graph of a transformation of pixel values using a transfer function at a client device in accordance with an implementation of the present disclosure.

Referring now to FIG. 4, graph 400 illustrates an example transformation of pixel values using a transfer function at client device 106 (FIG. 1) after the decoding process to ensure a video or image displays correctly on display 30 (FIG. 1). The X-axis represents pixel input values 402 of the decoded image using the modified EOTF curve 14 for use with the transfer function. The pixel input values 402 may range from 0 to 255. For example, pixel input values 402 may be from the decoded modified SDR content 16. The Y-axis represents pixel output values 404 of the SDR content 28 computed by the transfer function. The pixel output values 404 may range from 0 to 255 and may convert the SDR content 28 according to standard SDR values. In this example, the pixel output values 404 of the SDR content 28 are in a Rec. 709 format. The curve 406 illustrates the pixel output values 404 for the SDR content 28 versus the pixel input values 402 for the modified SDR content 16. For example, color processing component 26 may use the transfer function to convert the pixel input values 402 for the modified SDR content 16 into pixel output values for the SDR content 28 in a Rec. 709 format.

Figure 5:
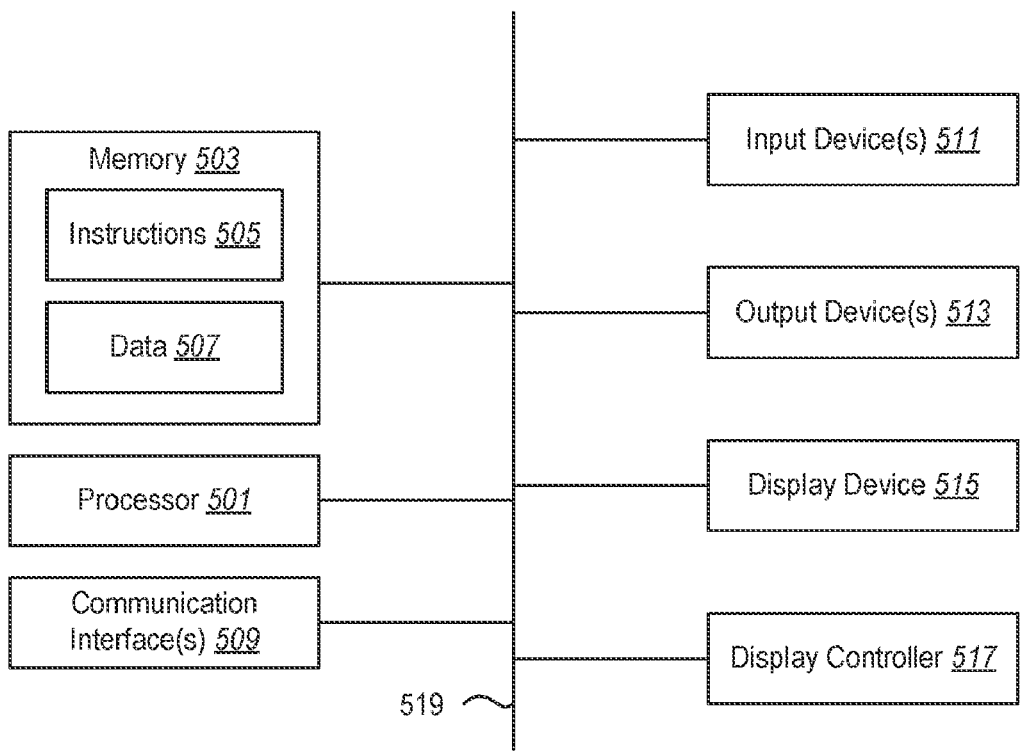
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. In a computer system, a method comprising:
  receiving standard dynamic range ("SDR") content;
  converting the SDR content into modified SDR content according to a modified Electro-Optical Transfer Function ("EOTF") curve, including converting nonlinear input values of the SDR content into corresponding optical output values of the modified SDR content according to the modified EOTF curve, wherein the modified EOTF curve covers up to 100 nits while allowing encoding at a given number of bits of color depth and mitigating banding in the SDR content;
  providing the modified SDR content to an encoder;
  generating encoded data for the modified SDR content by encoding, with the encoder, the modified SDR content using the given number of bits of color depth; and
  outputting the encoded data.

2. The method of claim 1, further comprising:
outputting, in metadata associated with the encoded data, information that indicates use of the modified EOTF curve.

3. The method of claim 2, further comprising:
outputting, in the metadata associated with the encoded data, custom information that specifies the modified EOTF curve.

4. The method of claim 2, wherein the metadata associated with the encoded data is transmitted as sideband data according to a container format.

5. The method of claim 1, wherein, due to the converting the SDR content into the modified SDR content, loss of visual information for portions of the SDR content is reduced during the encoding the modified SDR content.

6. The method of claim 1, wherein the modified EOTF curve mitigates banding for dark portions of the SDR content by increasing a level of granularity of pixel values for corresponding dark portions of the modified SDR content.

7. The method of claim 6, wherein, due to the converting the SDR content into the modified SDR content, loss of visual information for the dark portions of the SDR content is reduced during the encoding the modified SDR content.

8. The method of claim 1, wherein the modified EOTF curve maps values with the given number of bits of color depth in color channels of the SDR content to values with the given number of bits of color depth in color channels of the modified SDR content.

9. The method of claim 8, wherein the values with the given number of bits of color depth in the color channels of the modified SDR content have a higher level of granularity for dark values compared to the values with the given number of bits of color depth in the color channels of the SDR content.

10. The method of claim 1, wherein the modified EOTF curve, compared to an EOTF curve defined in Society of Motion Picture and Television Engineers ("SMPTE") Rec. 709, has a higher level of granularity for pixel values in dark portions.

11. A computer system, implemented with memory and one or more processing units, configured to perform operations comprising:
receiving encoded data for modified standard dynamic range ("SDR") content;
decoding, with a decoder, the encoded data into the modified SDR content, the encoded data having been encoded using a given number of bits of color depth;
providing the modified SDR content to a color processing component;
with the color processing component, converting the modified SDR content into SDR content according to a transfer function that maps optical values of the modified SDR content to corresponding nonlinear values of the SDR content to compensate for a modified Electro-Optical Transfer Function ("EOTF") curve that covers up to 100 nits while allowing encoding at the given number of bits of color depth and mitigating banding in the SDR content; and
outputting the SDR content for display.

12. The computer system of claim 11, wherein the operations further comprise:
receiving, in metadata associated with the encoded data, information that indicates use of the modified EOTF curve; and
determining, based on the information, that the modified SDR content has been converted from the SDR content according to the modified EOTF curve.

13. The computer system of claim 12, wherein the operations further comprise:
receiving, in the metadata associated with the encoded data, custom information that specifies the modified EOTF curve.

14. The computer system of claim 12, wherein the metadata associated with the encoded data is received as sideband data according to a container format.

15. The computer system of claim 11, wherein the modified EOTF curve mitigates banding for dark portions of the SDR content by increasing a level of granularity of pixel values for corresponding dark portions of the modified SDR content.

16. The computer system of claim 11, wherein the transfer function maps values with the given number of bits of color depth in color channels of the modified SDR content to values with the given number of bits of color depth in color channels of the SDR content.

17. The computer system of claim 16, wherein the values with the given number of bits of color depth in the color channels of the modified SDR content have a higher level of granularity for dark values compared to the values with the given number of bits of color depth in the color channels of the SDR content.

18. The computer system of claim 11, wherein the modified EOTF curve, compared to an EOTF curve defined in Society of Motion Picture and Television Engineers ("SMPTE") Rec. 709, has a higher level of granularity for pixel values in dark portions.

19. One or more non-transitory computer-readable media having stored thereon encoded data for modified standard dynamic range ("SDR") content, the modified SDR content having been converted from SDR content according to a modified Electro-Optical Transfer Function ("EOTF") curve that maps nonlinear input values of the SDR content into corresponding optical output values of the modified SDR content, the modified EOTF curve covering up to 100 nits while allowing encoding at a given number of bits of color depth and mitigating banding in the SDR content, the encoded data having been encoded using the given number of bits of color depth, and the encoded data being organized to facilitate playback, in a computer system that implements a decoder, by operations comprising:
decoding, with a decoder, the encoded data into the modified SDR content;
providing the modified SDR content to a color processing component;
with the color processing component, converting the modified SDR content into the SDR content according to a transfer function; and
outputting the SDR content for display.

20. The one or more non-transitory computer-readable media of claim 19, wherein the operations further comprise:
receiving, in metadata associated with the encoded data, information that indicates use of the modified EOTF curve; and
determining, based on the information, that the modified SDR content has been converted from the SDR content according to the modified EOTF curve.

* * * * *